United States Patent [19]

Baird et al.

[11] Patent Number: 4,672,574

[45] Date of Patent: Jun. 9, 1987

[54] DATA COMMUNICATION SYSTEM WITH TERMINAL FOR DISPLAYING THE CODED STREAM OF DATA BEING TRANSMITTED

[75] Inventors: Suzanne K. Baird, Austin; Douglas M. Benignus, Round Rock; Dennis G. Busch; Astrid P. Jeffries, both of Austin; Thomas S. Parker, Cedar Park; Robert A. Vossman, Austin, all of Tex.

[73] Assignee: International Business Machines Corporation, Armonk, N.Y.

[21] Appl. No.: 274,049

[22] Filed: Jun. 16, 1981

[51] Int. Cl.[4] ...................... G06F 3/00; G06F 11/00; G01R 31/28

[52] U.S. Cl. ................................. 364/900; 340/721; 371/29

[58] Field of Search ... 364/200 MS File, 900 MS File; 340/721, 723, 734; 370/20, 29, 67, 13, 15, 17; 371/13, 16-20, 29

[56] References Cited

U.S. PATENT DOCUMENTS

| | | | |
|---|---|---|---|
| 3,518,657 | 6/1970 | Zinn et al. | 340/720 |
| 3,559,208 | 1/1971 | Di Giugno et al. | 364/200 |
| 3,573,791 | 4/1971 | Hesse | 340/790 |
| 3,701,971 | 10/1972 | Sanner et al. | 364/200 |
| 3,778,767 | 12/1973 | Carlyle et al. | 371/29 |
| 3,798,633 | 3/1974 | Hofstein | 340/797 |
| 3,889,062 | 6/1975 | Epstein | 179/2 DP |
| 3,906,445 | 9/1975 | Beckmann et al. | 364/200 |
| 4,057,847 | 11/1977 | Lowell et al. | 364/200 |
| 4,192,451 | 3/1980 | Swerling et al. | 371/20 |
| 4,225,918 | 9/1980 | Beadle et al. | 364/200 |
| 4,308,615 | 12/1981 | Koegel et al. | 371/20 |
| 4,334,308 | 6/1982 | Thinschmidt et al. | 371/29 |
| 4,356,545 | 10/1982 | West | 364/200 |
| 4,398,498 | 7/1983 | Jackson et al. | 371/20 |
| 4,424,576 | 1/1984 | Lange et al. | 364/900 |
| 4,463,418 | 7/1984 | O'Quin, II et al. | 364/200 |
| 4,480,317 | 10/1984 | Haag et al. | 364/900 |

FOREIGN PATENT DOCUMENTS 8000375 3/1980 PCT Int'l Appl. ............. 324/73 R

OTHER PUBLICATIONS

G. Gordon et al, Hexadecimal Signatures Identity Troubleshoots in Microprocessor Systems, Electronics (Mar. 3, 1977) pp. 89-96.
B. LeBoss, Logic Unit Monitors IEEE-488 Buses, Electronics (Jan. 5, 1978), p. 189.
A. Santoni, Testers Are Getting Better at Finding Microprocessor Flaws, Electronics (Dec. 23, 1976), pp. 57-66.

*Primary Examiner*—Archie E. Williams
*Assistant Examiner*—William G. Niessen
*Attorney, Agent, or Firm*—Thomas E. Tyson; J. B. Kraft

[57] ABSTRACT

A communication system is provided in which one data transmitting display terminal has the capability of transmitting a data stream in coded form to at least one data receiving terminal over a communication linkage. This data transmitting terminal further includes the capability of displaying, when necessary, the stream of coded data directly on its display so that if there is a transmission problem, the coded data itself can be analyzed in diagnosing the problem.

The present communications system has the further capability of diagnosing data streams at remote display terminals. For example, if one transmitting terminal is communicating with a receiving terminal and a problem arises between the two terminals, the system provides the capability of the transmitting terminal sending the data stream to another receiving terminal remote from the first two terminals. This remote receiving terminal is a display terminal having the capability of displaying the received stream of coded data whereby the problems between the two communicating terminals may be diagnosed at a remote location where better engineering support may be available.

4 Claims, 13 Drawing Figures

| COMMUNICATION | Brief | | Pg. 1 | Ln. 34 | Kyb 122 | Pitch 12 |

Setup: DIMEBOX 2741    History Store: OFF    Document Send: OFF

```
R  F2 F3 F4 16 1F                                                       ~91
S  16 1C n 7C o w      i s    m e n t   t h e i r    t i m e   c o m e  f o r  a l
         g o o d           1C 45 5B 5E 5E  5D 5D 5D 5D 76 76 76 76 76 7C
         c o u n t r y 1F                                               ~92

R  16 1C 1F
S  16 1C d 7C i d     1C j 7C o h n   s e e   t h e   q u i
         c k  r e d      1C f o x           5E 5E 5E 5E 5E 1F
         w h i t e       f e n c e
                  E3 28 E1 36 1C j 7C j u m p   o v e r   t h e
                                    1C 70 7C 5B 5E 5E 5E 5E 5E 1F
                           E1 1E o x   j u m p   o v e r   t h e  q u
                                    1C 70 5B 5E 5E 5E 5E 5E 1F        e
                                                                     ~93
S  16 1F
R  E4 FF                                                               ~94
```

DATA COMMUNICATION SYSTEM WITH TERMINAL FOR DISPLAYING THE CODED STREAM OF DATA BEING TRANSMITTED

CROSS-REFERENCE TO RELATED APPLICATIONS

The following related applications are cross-referenced and will be discussed hereinafter in the specification.

D. M. Benignus et al, Communication Adapter Circuit, Ser. No. 274,300, filed on June 16, 1981, now U.S. Pat. No. 4,467,445.

D. G. Busch, Data Communications System with Receiving Terminal for Varying the Portions of Received Data Being Displayed, Ser. No. 274,050, filed June 16, 1981, now U.S. Pat. No. 4,577,288.

W. C. Cason et al, Multi-Directional Cursor Motion, Ser. No. 208,568, filed on Nov. 20, 1980, now U.S. Pat. No. 4,445,194.

BACKGROUND OF THE INVENTION

1. Field of the Invention

This invention relates to communication of data between a transmitting terminal and a receiving terminal. More particularly, it relates to a communication system which at least one of the terminals is a display terminal.

2. Description of the Prior Art

Communications wherein streams of coded data have been transmitted over communication linkages between transmitting terminals and receiving terminals have been in use for at least 75 years. In earlier conventional communications terminals, such as telegraphic equipment, the alphanumeric data was printed at the receiving end. In recent years, the receiving terminals have the capability of displaying the received alphanumeric data.

Where such conventional communicating terminals are functioning properly, they operate quite effectively. On the other hand, where there are communication problems either resulting in no alphanumeric data being received or erroneous alphanumeric data being received, or protocol incompatabilities, diagnoses of the problems has in the past often been time consuming and costly. There are available complex diagnostic apparatus which may be operated in association with terminals to diagnose problems. However, these are costly, require special set ups and special operator training. Very often such problems result in the non-use of the equipment until service engineers can visit the sites of the transmitting or receiving terminals and go through rather complex diagnostic routines. This results in problem communications equipment being "down" while the problem conditions exist.

SUMMARY OF THE INVENTION

The present invention provides a communication system wherein the time lost by the system is the result of problem conditions in communication is minimized. Very often, the error or problem condition can be diagnosed by the transmitting or receiving operators alone without the need for visits by service personnel and the resultant delays. In addition even if intervention by service personnel is necessary, the present invention provides an expedient by which the communication equipment itself has the capability of transmitting the data stream in which the error condition has occurred to a remote location where service engineering aid is available so that the data stream may be diagnosed there thus avoiding the need for customer service visits.

The present invention is directed to a data communication system comprising at least one data transmitting terminal having means for transmitting a data stream in coded form and at least one data receiving terminal adapted to receive the transmitted data and a communication link between said transmitting and said receiving terminals. The present invention involves the improvement wherein at least one of these terminals has the capability of displaying the coded data stream directly on the display terminal.

This data transmitting terminal is preferably a word processing terminal which of course includes means for displaying formatted alphanumeric data. The capability of displaying the coded data stream represents a capability on the word processing display terminal in addition to its alphanumeric display capability.

In accordance with a further aspect of the present invention the receiving terminal may be the display terminal and particularly a word processing display terminal which has a similar capability for displaying the coded data stream.

Further, in accordance with an additional significant aspect of the present invention, the system has the capability of communicating with a remote terminal in case of an error or problem condition. In other words this remote terminal is not part of the communication linkage between a transmitting terminal and the receiving terminal. However, should an error or problem condition occur, the receiving terminal may communicate with the remote terminal and send to this remote terminal the data stream between the initial two terminals in which the error or problem condition occurred. The remote terminal, which is a display terminal, has the capability of displaying communicated coded data streams so that service engineers at that remote location may analyze the problem and correct it.

BRIEF DESCRIPTION OF THE DRAWING

Referring now to the drawings, wherein a preferred embodiment of the invention is illustrated, and wherein like reference numerals are used throughout to designate like parts.

DESCRIPTION OF THE PREFERRED EMBODIMENT

Figure 1A:
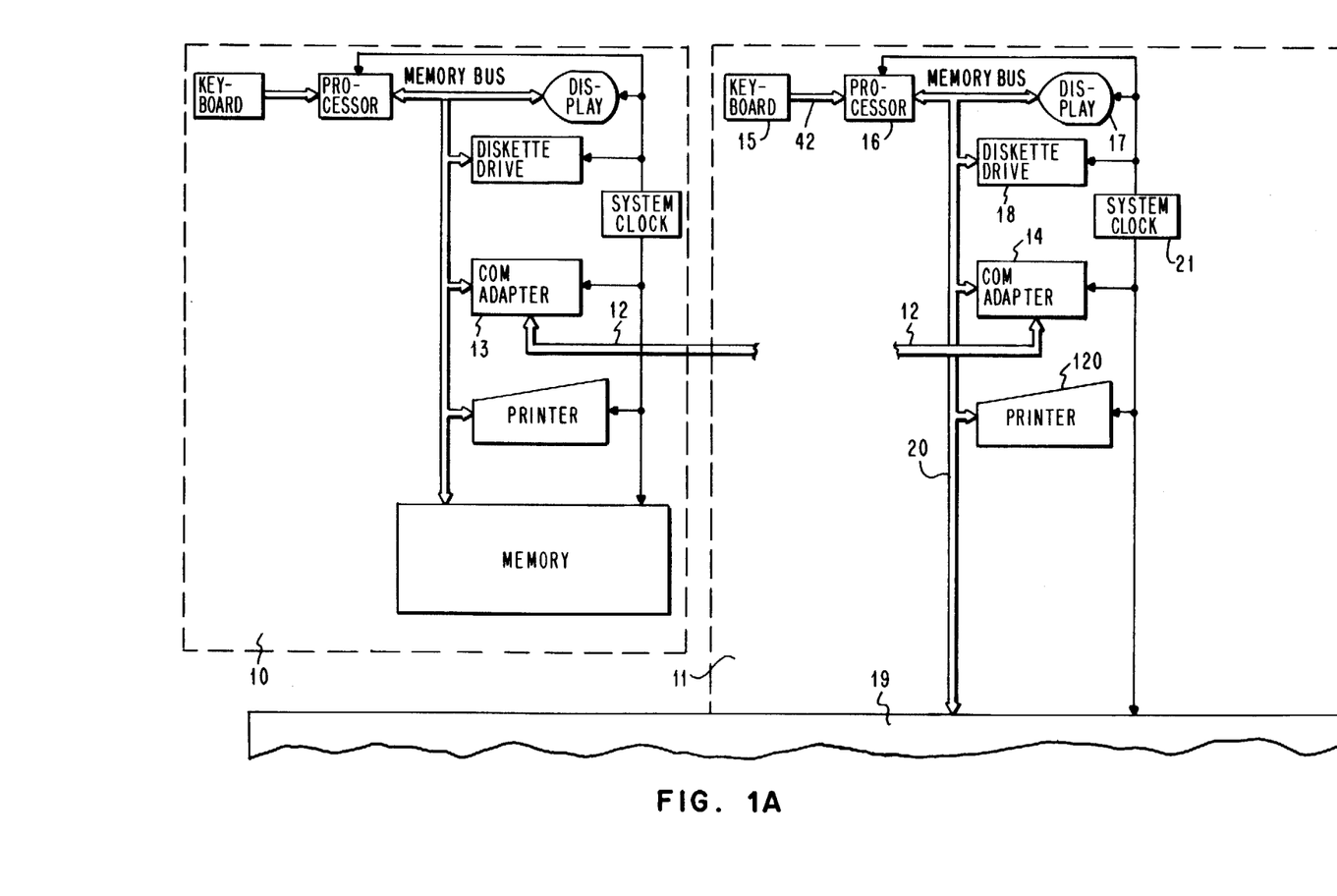
FIG. 1A is a first portion of a logical block diagram showing the apparatus of the present invention.
Figure 1B:
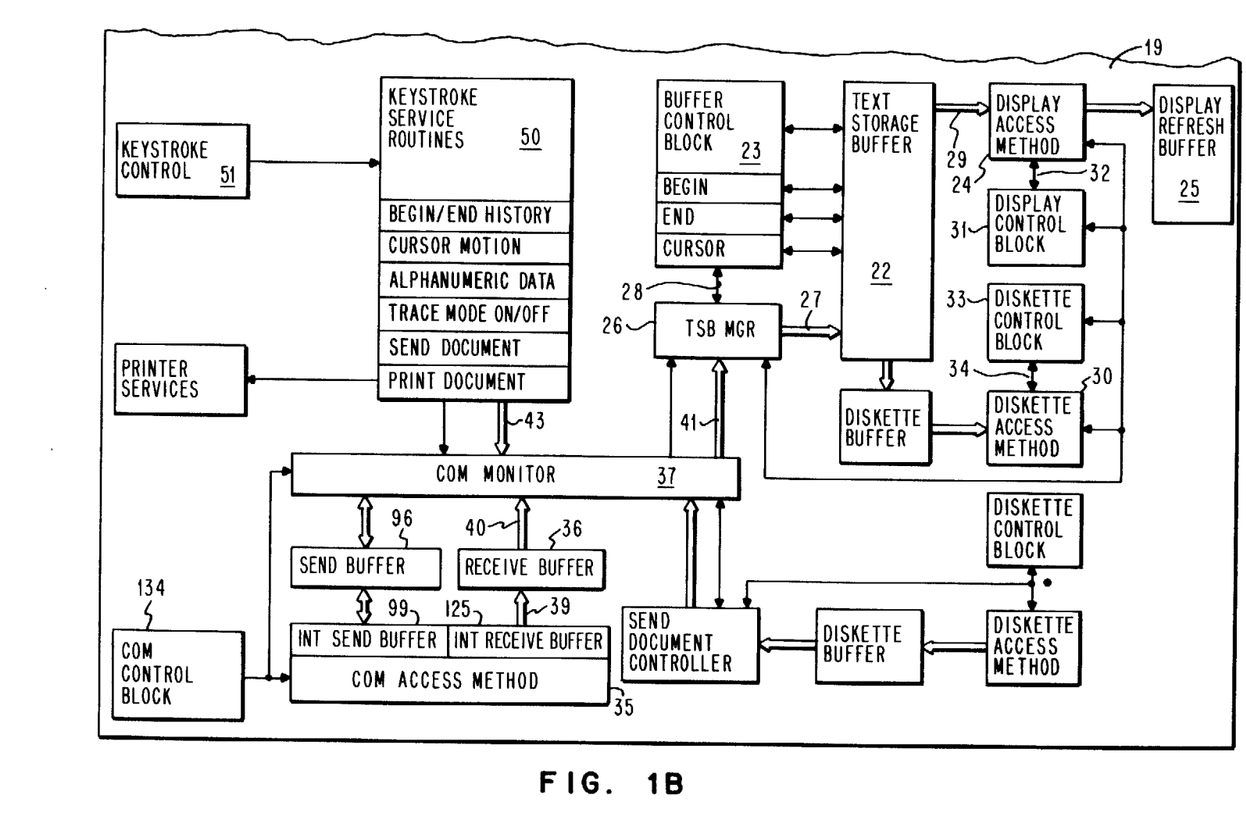
FIG. 1B is the other portion of the logical block diagram of FIG. 1A to complete the apparatus of the present invention.

With reference to FIG. 1 a communication system in accordance with the present invention is shown. The communication system comprises a first display terminal 10 and second display terminal 11 remote from the first display terminal 10. For purpose of this description, we will deal primarily with the second display terminal 11. Before going through the various procedures involving this second display terminal 11 in carrying out various aspects of the present invention, we will first describe most of the major units in this second display terminal. These units will be described primarily in accordance with their function when the second display terminal 11 is in a receive mode. Then, after the functions of the units have been described, we will proceed to describe the various operations of the apparatus of the present invention using a series of flow charts.

Now with reference to FIG. 1, terminals 10 and 11 communicate with each other over a bus 12. Each of the terminals includes a communications adapter 13 and 14, each respectively connected to bus 12. The communications adapters may be any standard device having capability, at the transmitting end, of converting parallel to serial data so that the data may be communicated over external lines and, at the receiving end, for reconverting the received serial data into parallel form so that it may be handled by the receiving display terminal. These communications adapters will not be described in detail since they are not involved in the present invention which is directed to how transmitted data is handled once it is received at the receiving terminal.

The mode of communication over bus 12 which represents a link between the two terminals is an asynchronous serial communication. The communication adapter which can be used in the present invention is described in detail in co-pending application of D. M. Benignus, et al., assigned to the assignee of the present application and identified with Ser. No. 274,300, filed on June 16, 1981. For purposes of describing the communications adapter, said co-pending application is hereby incorporated by reference. In addition, the general operations of the display terminals 10 and 11 and communication therebetween is set forth in another co-pending application, D. G. Busch, entitled "Data Communications System With Receiving Terminal For Varying The Portions Of Received Data Being Displayed" assigned to the assignee of the present invention and identified with Ser. No. 274,050 also filed on June 16, 1981 and hereby incorporated by reference.

In the present embodiment both the first and second terminals 10 and 11 are display terminals. The following description made with respect to the second display terminal 11 is also substantially applicable to the first display terminal 10. In display terminal 11, the operator accesses the machine through operator control keys on a keyboard 15. The keyboard drives a processor 16. The processor 16 is operably interconnected into a visual display 17, a diskette drive 18, and a random access memory 19 via memory bus 20. A system clock 21 is provided for the timing functions within display terminal 11. The information transmitted from display terminal 10 to remote display terminal 11 is serially and asynchronously sent over bus 12 to communications adapter 14. Communications adapter 14 does a serial to parallel conversion of the input data and sends it over a memory bus 20 to memory means 19 which has the capability of storing the received data and displaying it on visual display 17 as soon as it is received or at some subsequent time. Memory 19 includes a number of data areas and functional programs for operating with the input data into it through bus 20 from communications adapter 14. The received data sent to memory 19 from communications adapter 14 is stored in text storage buffer 22 sequentially in the order in which it is received. Handling and updating of the text storage buffer 22 is controlled by routines stored within text storage buffer manager block 26 (TSB) which will be hereinafter described.

A display access method controls the formatting of alphanumeric text representative of the stored data on visual display screen 17 through display refresh buffer 25. It should be noted that the display refresh buffer 25 may operate in any conventional manner however in the present example, a BUILD subroutine is used which is described in co-pending U.S. patent application, Ser. No. 208,568, filed Nov. 20, 1980 in the name of W. C. Cason, et al., assigned to the assignee of the present invention. This patent application is incorporated by reference so far as it may be necessary to provide background material with respect to the display operation.

Text storage buffer (TSB) manager block 26 is connected to text storage buffer 22 by channel 27. The text storage buffer manager block 26 is further connected to the buffer control block 23 through a channel 28. As we previously indicated the data representative of the alphanumeric text is input to buffer 22. The data representative of characters is stored sequentially in text storage buffer 22 in the order in which it is received. For convenience in description, this data will be referred to as text character data. In displaying characters, the text character data, stored in buffer 22 is communicated to display access method 24 over channel 29. It should be noted that corresponding diskette access method block 30 is used instead of access method block 24 when communication between the text storage buffer 22 and the diskette 18 is desired. A display control block 31 connected through a channel 32 with display access method block 24 the corresponding diskette control block 33 communicates with diskette access method block 30 over channel 34 when access to the disk drive is required.

In any event, a normal alphanumeric display operation, as soon as information communications adapter 14 is received by text storage buffer 22, this information is transmitted over channel 29 to display access method 24 and then via channel 34 to display refresh buffer 25. The information stored in display refresh buffer 25 is representative of the actual alphanumeric information shown on display 17. The display control block 31 serves to store flags status information as required by the operation of display access method block 24. It should be noted that we previously described received data being directed from the communications adapter to the text storage buffer 22 over bus 20. Actually this process involves several steps. Information from a communication adapter 14 is put onto bus 20 which takes the data to communication access method block 35, which will be hereinafter described in greater detail, under the direction of communication control block 134 after which the data is input over channel 39 to receive buffer 36 and then over channel 40 to communications monitor 37. Information from communications monitor 37 is input over channel 41 to the text storage buffer (TSB) manager block 26 as previously described. Then the data is input to text storage buffer 22 over channel 27 under the direction of TSB MGR block 26.

As noted previously, the operator controls the processes being described through a keyboard 15 communicating through processor 16. Standard keyboard entry processes will be described in general detail. As the operator enters each keystroke at the keyboard 15, a corresponding signal is transmitted through channel 42 to processor 16 which enters the keystroke command into memory 19. In the memory, upon receipt of a keystroke command, a keystroke routine is produced in the keystroke service block 50 to handle the particular command received. This is carried out under the control of keystroke control block 51. The keystroke command is then processed via channel 43 to communications monitor 37 and channel 41 to the text storage buffer manager block 26 which has the program buffer control block 23 to carry out various processes with respect to the data stored in a text storage buffer 22.

In addition to the logic described above in FIG. 1 which functions to perform the general alphanumeric display, receive and transmit the functions of the communication system, there is additional hardware in FIG. 1. which will be subsequently described as particiating into the specific aspects of the present invention. The logic of FIG. 1 will be now considered in connection with data handling processes which will be subsequently described with respect to FIGS. 2 through 11. With respect to the flow charts of FIGS. 2 through 10, the descriptions will always be in conpection with the hardware of FIG. 1.

Figure 2:
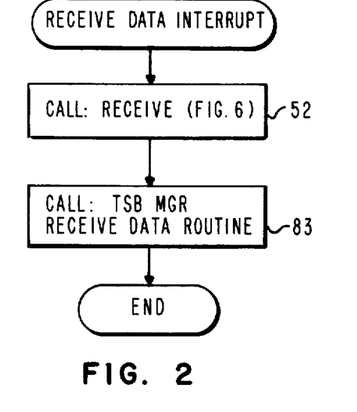
FIG. 2 is a flow chart of receive data interrupt which takes place when data is coming into the receiving terminal.
Figure 6:
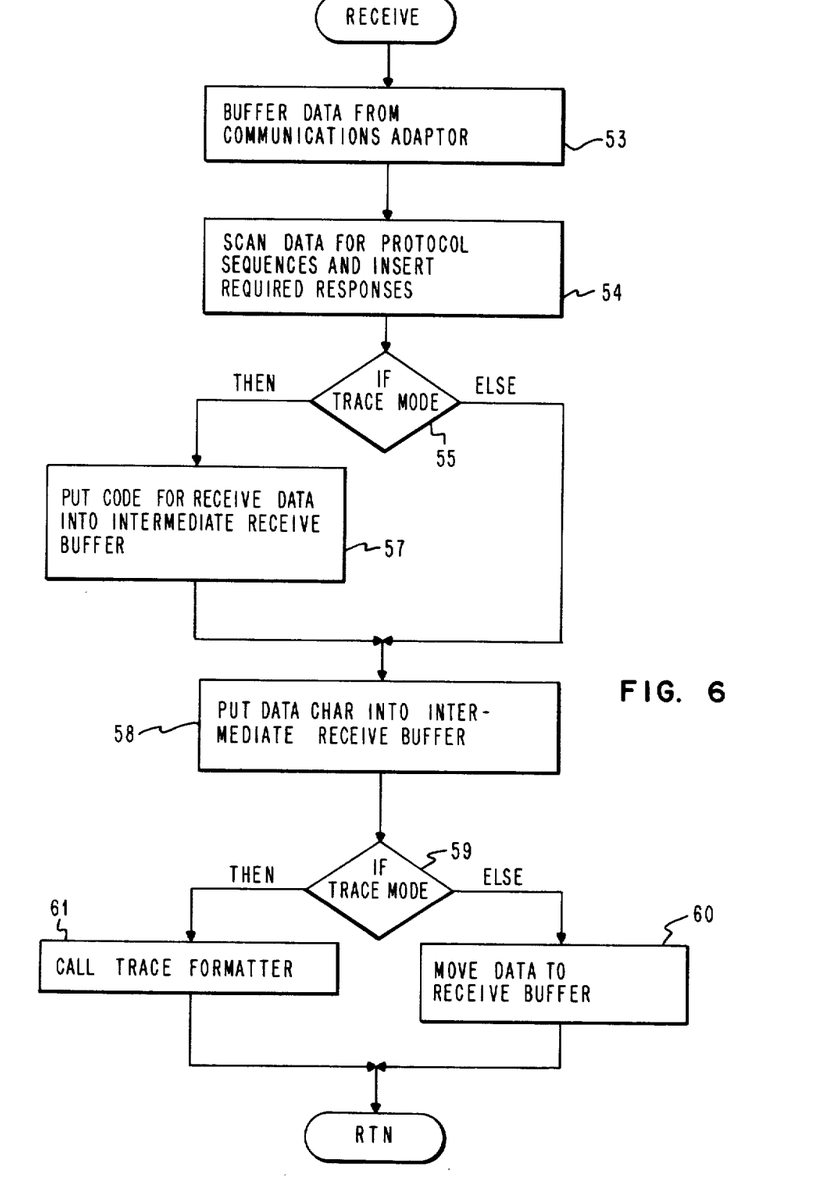
FIG. 6 is a flow chart of the receive subroutine operating when the apparatus is in the receive data mode.

Let us assume that terminal 10 is serving as the transmitting terminal and sends data over bus 12 to receiving terminal 11. At the time data is received in communications adapter 14 of receiving terminal 11, let us further assume that receiving terminal 14 is a word processing terminal dormant. When the data is received in communications adapter 14, a "Receive Data Interrupt" process shown in the flow chart of FIG. 2 is commenced. First, step 52, the receive routine shown in FIG. 6 is called. This receive routine is stored in communications access method block 35. First, step 53, the data from communications adapter is buffered. Next, step 54, the buffered data is scanned for protocol sequences and required responses are inserted using techniques involved in the asynchronous communication protocols which are not part of the present invention and will not be described in detail. Then, step 55, a decision is made as whether or not the operation is in the trace display mode or the conventional alphanumeric display mode. As will be described subsequently in greater detail with respect to FIG. 10, the operator places the equipment in the trace mode by merely depressing a key on the keyboard and calling up a trace service routine out of block 50. By a trace mode, we mean a mode in which the display does not display the formatted alphanumeric data but rather displays the coded data stream being transmitted to the terminal 11 which is in the receiving mode. In any event if as a result of the decision involved in step 55, it is determined that the operator has placed the equipment in the trace mode, then all of the codes for the data being received are put into an intermediate receive buffer 125 associated with the communications access method 35 (FIG. 1), as set forth in step 57 in FIG. 6. Then, step 58, alphanumeric character data is placed into intermediate receive buffer 125 as shown in step 58 of FIG. 6. On the other hand if back at decision step 55 of FIG. 6, the equipment is not in the trace mode but in the normal alphanumeric data display mode then the operation immediately proceeds to step 58 and the alphanumeric character information is stored without any coding by proceeding directly to step 58.

Figure 7:
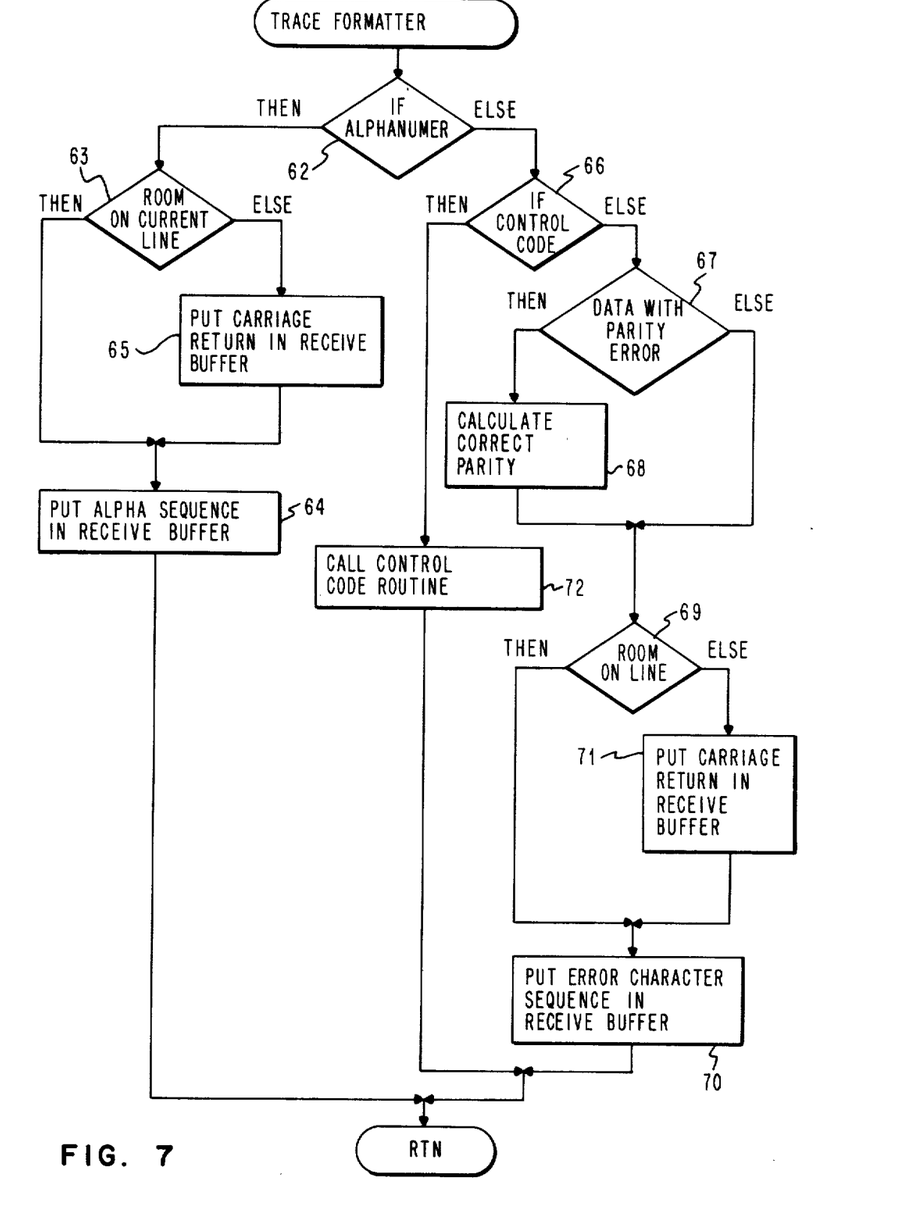
FIG. 7 is a flow chart of the trace formatter routine which operates to display the coded stream of data being transmitted.

Next, decision step 59, again determines whether the terminal is in the display mode. If it is not in the trace mode, then the information being stored in intermediate receive buffer 125, FIG. 1, is passed directly to receive buffer 36 as set forth in step 60 and the display of the alphanumeric information proceeds in the normal manner. On the other hand, step 61, if the apparatus is in the trace mode, the trace formatter procedure which will be described with respect to FIG. 7 is called. The trace formatter routine shown in FIG. 7 is also stored in the communication access method block 35. It involves the following steps. First, step 62, a determination is made as to whether each segment of data is a representative of an alphanumeric character. If it is, then a determination is made, step 63, as to whether there is room on the current line being stored in the text storage buffer 22 of FIG. 1 for another character. If there is, then the operation proceeds to step 64 and the alphanumeric character sequence is placed into receive buffer 36, FIG. 1, so that it may be subsequently stored in the text storage buffer 22 in a routine fashion as previously described. On the other hand, if there is not room on the current line, then, step 65, a carriage return indicator stored in the receive buffer 36 after which the alphanumeric data representative of the character itself is stored in the receive buffer in accordance with step 64.

Going back to decision step 62, a determination is made, step 66, as to whether the next segment of data is control code. If it is not control code then, decision step 67, a determination is made as to whether we have data with a parity error. If the data has a parity error, then, step 68, the parity error is calculated. Next, after the calculation of the parity error or in the case that there is no parity error, a determination is made step 69 as to whether or not there is room on the current line in text storage buffer 22 for the data. If there is, then, step 70, the character sequence indicative of the parity error condition is placed in the receive buffer 36 from which it can be subsequently moved to the text storage buffer and displayed as previously described. On the other hand, there is not room in the current line of text storage buffer then a carriage return is placed in the receive buffer according to step 71 and then data indicative of the error condition is placed in the receive buffer in accordance with step 70.

Figure 8:
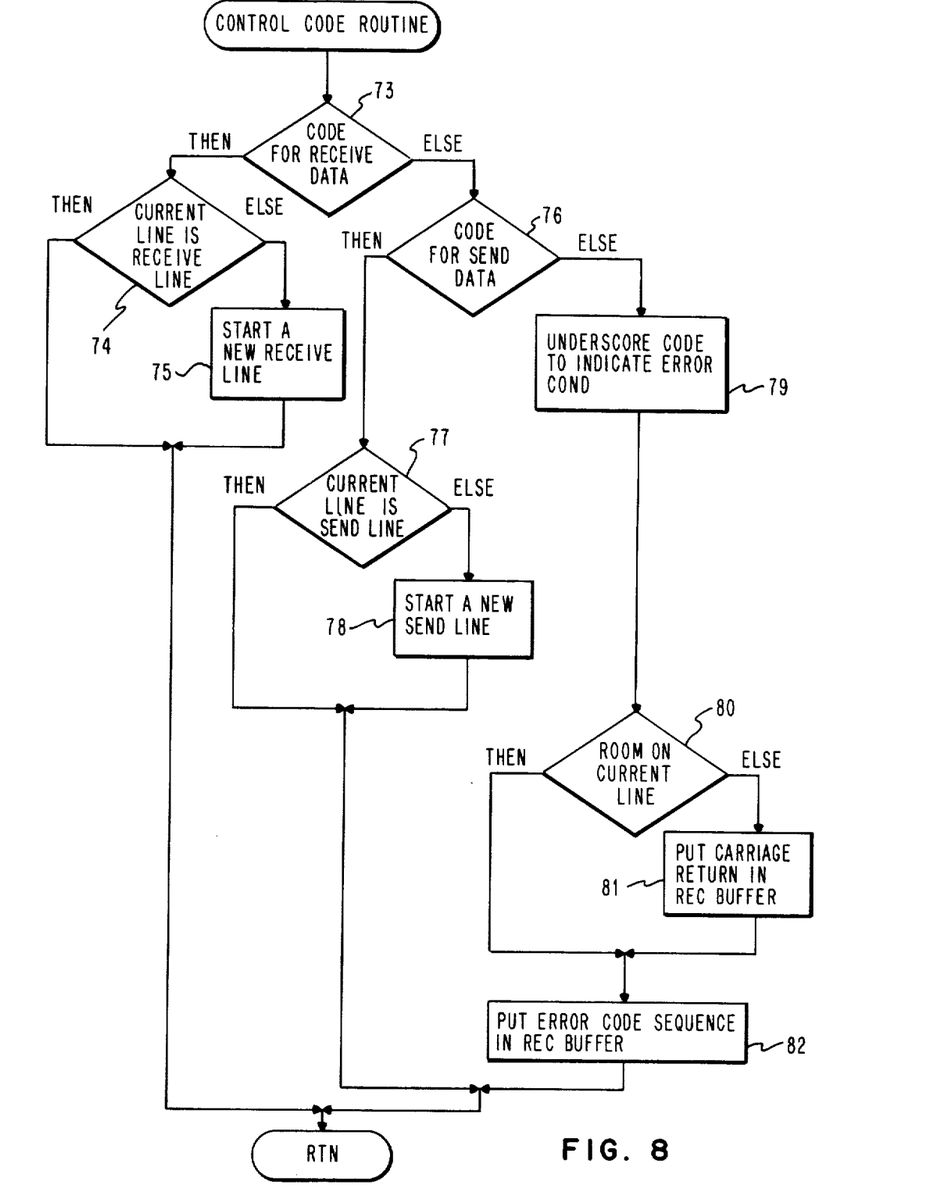
FIG. 8 is a subroutine to that of FIG. 7 for handling the determination of the type of control code involved in the data stream.
Figures 9, 10:
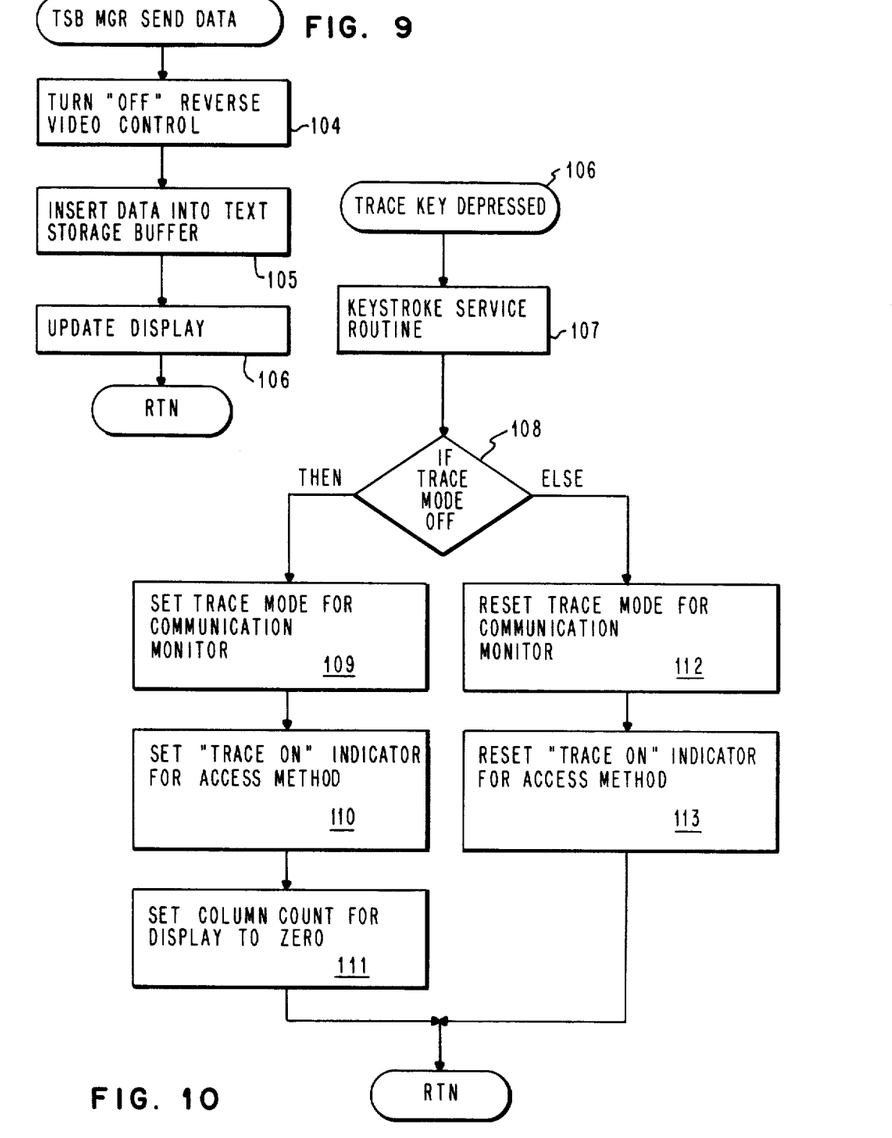
FIG. 9 is a flow chart of the operations involved in displaying data either alphanumeric or data stream when the terminal associated with the display is operating in the send mode.
FIG. 10 is a flow chart of the operations involved in the operator determining whether the display is to be operated in the normal alphanumeric or the coded data stream display mode.

Returning now to the decision of step 66 in the trace formatter routine of FIG. 7, if it is determined that the data being considered is control code, then, step 72, the control codes routine is called. The control code routine shown in FIG. 8 is also stored in communication access method block 35. Considering now the routine of FIG. 8 which determines the nature of the control code, a determination is first made, step 73, as to whether the code indicates received data. If this is the case then, step 74 a determination is made as to whether the current line in the text storage buffer of FIG. 1 is a receive line. If this is the case then the routine is returned. On the other hand if this is not the case then, step 75, a new receive line is commenced in the text storage buffer.

On the other hand if a determination is made in step 73 that code is not for receive data, then a determination is made at step 76 as to whether the code is for send data. If the code is for send data then a further determination is made, step 77, as to whether the current line in the text storage buffer 22 is a send line. If it is a send line then procedure is returned to the text formatter routine of FIG. 7.

If, step 77, a determination is made that the current line is not a send line, then, step 78, new send line is started in the text storage buffer 22 and the operation is returned to the trace format operation of FIG. 7. Still continuing with the control code determination routine of FIG. 8 if back at step 76 it is determined that the code is not one for send data, the code is underscored to indicate an error condition step 79 after which, step 80, a determination is made as to whether or not there is room on the current line in the text storage buffer 22. If there is not room on the current line then, step 81, a carriage return is put in the receive buffer 36 of FIG. 1, step 81, followed by the error code sequence being stored in receive buffer 36, step 82. On the other hand if there is room on the current line in text storage buffer then the error code is immediately placed in receive buffer step 82 after which operation is returned to trace formatter operation of FIG. 7.

Upon the completion of the trace formatter operation of FIG. 7, the operation is returned to the receive routine of FIG. 6 and the operation then returned the receive data interrupt operation of FIG. 2 which was preceding prior to the call of the receive routine of FIG. 6. Upon the return to the receive data interrupt routine of FIG. 2, the next step is to call the TSB manager receive data routine, step 83.

Figure 3:
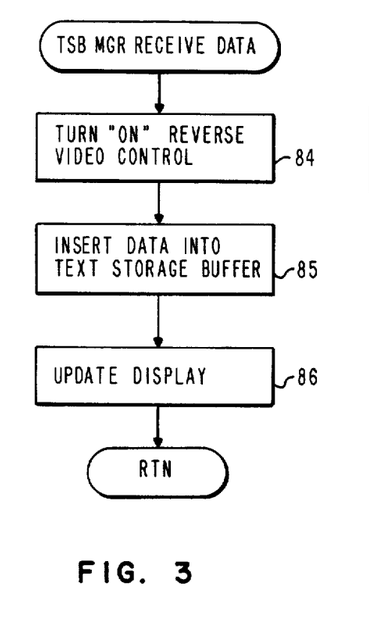
FIG. 3 is a flow chart of the operations of the text management buffer apparatus when data is received in order to update the display.

This TSB manager receive data routine is shown in FIG. 3. This routine which is maintained in the TSB MGR 26 of FIG. 1 has the following steps. In order to distinguish the received data from the display data which may have been transmitted or otherwise used in the display terminal, in step 84, the reverse video controls are turned on by TSB manager 26 whereby the reverse video image of received data will be stored in the text storage buffer 22 and consequently displayed the display refresh buffer 25. This is a conventional approach which is not part of the invention and is merely used in the apparatus to distinguish the receive data from other data in the display. Next, step 85, the receive data is inserted into the text storage buffer block 22 over channel 27 from TSB manager 26. Finally, step 86, the display is updated through the display access 24 in refresh buffer 25 to reflect this data. If additional details are required with respect to the updating of the display the data from the text storage buffer reference may be made to the above-mentioned patent application of D. G. Busch filed on the same date as the present application and assigned to a common assignee, Ser. No. 274,050.

After the display is updated, the operation is returned to the receive data interrupt operation of FIG. 2 which precedes to end. With the text storage buffer thus updated, it is now possible for the operator of the equipment or some service personnel to view the coded data stream or trace of the data being transmitted to receiving terminal 11 on display 17 of terminal 11. With this, information diagnosis of error conditions using the basic data stream becomes possible.

Figure 11:
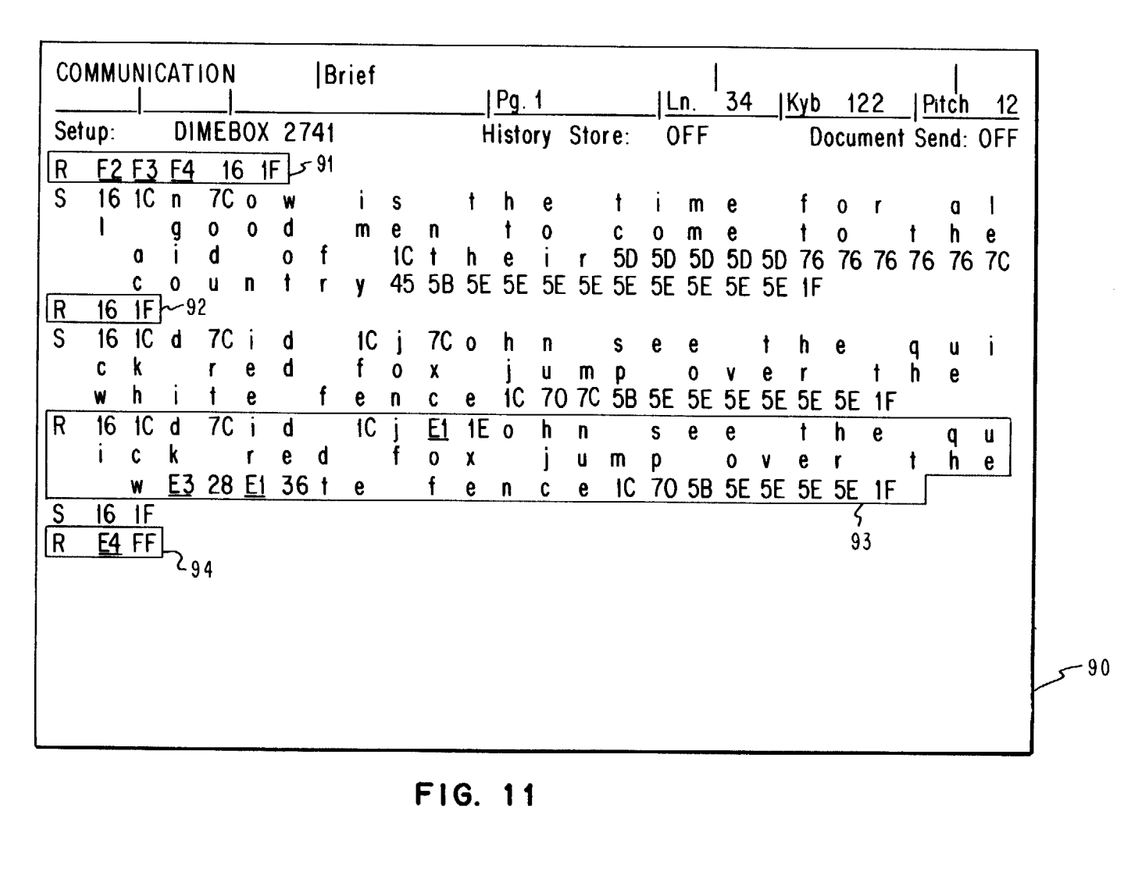
FIG. 11 is a diagrammatic illustration of the face of a display with coded data streams of both receive and send information being shown.

At this point, for purposes of illustration reference is made to FIG. 11 which shows the screen of a CRT display 90 which may be used as the display of the present invention in which streams of coded data both being received and sent by terminal 11 is shown. The received data line groups 91, 92, 93 and 94 are shown as enclosed by lines. Each of receive data groups 91, 92, 93 and 94 is preceded by the character "R" to indicate that it is receive data. On the other hand, the alternate line groups are each preceded by the character "S" to indicate sent data.

Figure 4:
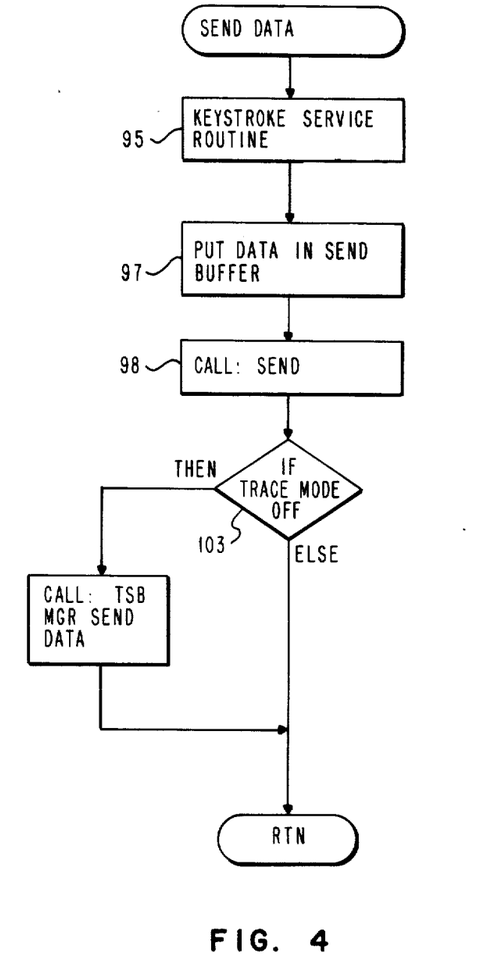
FIG. 4 is a flow chart of the operations of the apparatus when it is operating to send.

How the transmitted or sent data stream which is sent out from the terminal such as display terminal 11 to a remote terminal such as display terminal 10 is displayed on the display of the sending terminal 11 will now be described with respect to FIG. 4. In order to commence such an operation, the operator of the keyboard 15 indicates that he wishes to send data, this involves a keyboard interrupt. An interrupt service routine and keystroke control 51 accessed through the keyboard takes control and the keystroke data now being entered is verified through the keystroke services routine block 50 (step 95, FIG. 4). The data being entered through the keyboard is passed through group keystroke services 50 to communications monitor 37 on bus 43 to be stored in send buffer 96 of FIG. 1 (step 97, FIG. 4). At this point, the communications monitor 37 calls the send routine which is stored in the access method 35, step 98.

Figure 5:
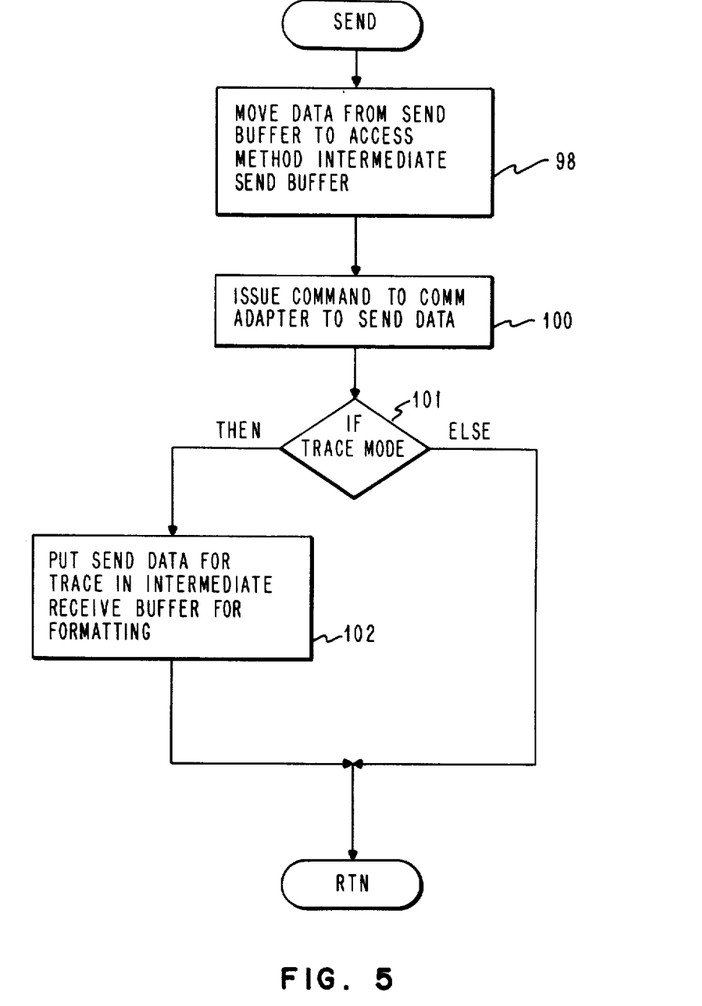
FIG. 5 is a flow chart of the operation of a subroutine during the sending of data.

This send routine is shown in FIG. 5. First, step 98, the data from the send buffer 96 is moved to intermediate send buffer 99 of the communications access method. Next, step 100 a command is issued to the communications adapter to send data which is being stored in the intermediate send buffer. At this point a decision is made, step 101, as to whether or not the operator has put the transmitting terminal 11 in a trace mode wherein the call coded data stream will be displayed on the display of the terminal 11. If it is in such a trace mode, then, step 102 FIG. 5, data from the communications adapter is placed in the receive buffer for formatting. This formatting has been previously described in detail for the receive operation with respect to FIG. 7. The formatting for a send operation is substantially the same since the send coded data stream is displayed in the same format as the received data stream. Next the operation is returned to send data routine of FIG. 4 where a determination is made, step 103, as to whether the trace mode is still off. If it is, the system calls the TSB manager send data routine of FIG. 9 so that the sent data may now be displayed. It should be noted that the TSB manager send data routine of FIG. 9 has steps which correspond to the "TSB manager receive data routine" of FIG. 3 except that the apparatus is in the send mode. First, step 104, the reverse video control is turned off as has been previously indicated; the reverse video mode on the display indicates receive data while the normal video mode on the display indicates send data. Next, step 105, the text is inserted in the text storage buffer 22. Finally, step 106, the display is updated as previously described and the operation returned to the send data routine of FIG. 4 which in turn returns the operation to the operator since the routine is completed.

We have previously mentioned that the display may be operated in the normal mode wherein the formatted alphanumeric data is displayed exactly as it will eventually be printed out, or alternatively the display may be operated in accordance with the present invention so as to display the coded data stream which is being transmitted or received. Status of the display is determined by the operator at the keyboard in accordance with the operation shown in FIG. 10. The display will normally operate in the alphanumeric mode wherein the data is displayed as it is formatted. If the operator wishes to display coded stream of data to either being transmitted or received, the operator depresses trace key on keyboard 15, step 106. The keyboard 15 then communicates through processor 16 and keystroke control 51 with the keystroke services routine 50 in accordance with step 107 where the keystroke service routine is trace mode on/off. Next following a routine in communications monitor 37 a determination is made, step 108 as to whether the trace mode is off. If the trace mode is off routine set trace mode for the communications monitor, step 109 then following a routine in the communications access method 35, the "trace on" indicator is set for the access method step 110 and the routine in the communications access method further sets the column count for the display to zero, step 111. This in effect initializes a counter at the beginning of a line. This counter is used in subsequently determining if there is room for another character on the line. On the other hand if at the decision step 108 the trace mode is not off, then the trace mode is reset for the communication monitor 37, step 112, after which the "trace on" indicator for the communication access method 35 is reset, step 113.

It should be noted that as the system of the present invention has the capability of displaying the coded data stream on the display of either the receive or transmitting terminal, it also has the capability of printing what is displayed, consequently the stream of coded data on the printer associated with the terminal. For example, if the stream of coded data is to be printed at the receive terminal 11 of FIG. 1, then it will be printed on printer 120 associated with that terminal following the standard procedure described in the aforementioned copending application entitled Data Communication System with Receiving Terminal for Varying the Portions of Received Data Being Displayed, D. G. Busch, assigned to the assignee of the present invention, Ser. No. 274,050. The standard procedure described in said copending application involves the transfer of the data to be printed from the text storage buffer 22 onto a storage diskette and then utilizing the information stored on the diskette to control the printer in the conventional manner.

Figure 1C:
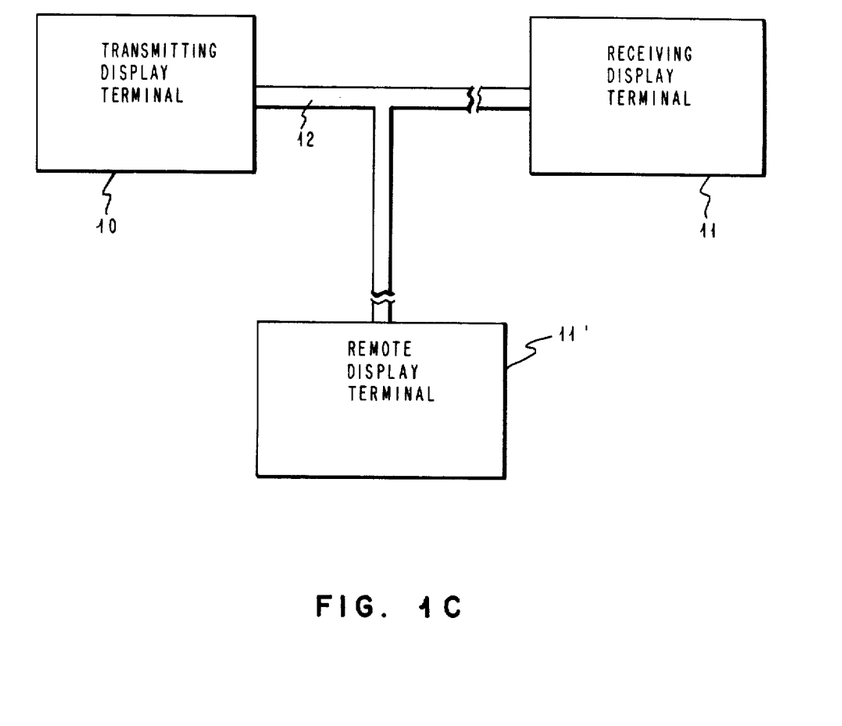
FIG. 1C is a generalized diagram showing the communications relationship between the transmitting terminal, a receiving terminal, and a remote terminal.

In accordance with another aspect of the present invention, it was previously noted that the present invention is applicable to a situation wherein there is data being transmitted from terminal 10 to terminal 11 when a problem occurs in the transmission. The situation may arise where while either terminal has the capability of displaying the coded data stream so that the problem may be diagnosed, the problem itself may be sufficiently complex that diagnosis is beyond the capability of the personnel associated with either the transmitting or receiving terminals. For example, let us assume that the people associated with both terminals are operators and the problem is such that a service engineer is necessary to diagnose the problem. In such a situation, FIG. 1C the transmitting terminal 10 may transmit the identical data stream which has been transmitted to receiving terminal 11 to another remote terminal 110 which has the identical apparatus of receiving terminal 11 as previously described. Then, at that remote terminal the personnel having diagnostic capability to solve the problem have the opportunity for the identical data stream to be displayed on this third terminal so that the problem may be diagnosed.

While the invention has been particularly shown and described with reference to a preferred embodiment it will be understood by those skilled in the art that various other changes in form and detail may be made without departing from the spirit and scope of the invention.

What is claimed is:

1. In a data communication system comprising at least one data transmitting word processing display terminal having means for transmitting a stream of data in coded form representative of alphanumeric text data, means for displaying said alphanumeric data, at least one data receiving terminal adapted to receive said transmitted data, and a communications link between said transmitting and receiving terminals, the improvement wherein at least one data transmitting terminal further includes means for displaying the stream of representative data in said coded form directly on said display terminal, and wherein said receiving terminal to a word processing display terminal having means for displaying said alphanumeric text data and for displaying the stream of representative data in said coded form directly on said receiving display terminal, and means for selectively changing to and from a first display mode for displaying said stream of representative data in said coded form and a second display mode for displaying said alphanumeric data.

2. The data communications system of claim 1 wherein at least one of said word processing display terminals has printing means associated therewith, and further including means for printing said stream of data in said coded form.

3. A data communication system comprising:

at least one data transmitting display terminal having means for transmitting a stream of data in coded form representative of alphanumeric text data, means for displaying said alphanumeric data, means for displaying the stream of representative data in said coded form directly on said display terminal and means for selectively alternating between displaying the stream of representative data in said coded form and displaying said alphanumeric text data;

at least one data receiving display terminal adapted to receive said transmitted data and having means for displaying said alphanumeric text data and including means for displaying the stream of representative data in said coded form directly on said display terminal and means for selectively alternating between displaying the stream of representative data in said coded form and displaying said alphanumeric text data; and a communication link between said transmitting and receiving terminals.

4. A data communications system according to claim 3 wherein at least one of said display terminals includes printing means for printing said stream of data in said coded form.

* * * * *

UNITED STATES PATENT AND TRADEMARK OFFICE
CERTIFICATE OF CORRECTION

PATENT NO. : 4,672,574
DATED : June 9, 1987
INVENTOR(S) : S. K. Baird et al

It is certified that error appears in the above-identified patent and that said Letters Patent is hereby corrected as shown below:

Col. 10, line 27, delete "to" and insert --is--.

Signed and Sealed this

Twenty-first Day of January, 1992

Attest:

HARRY F. MANBECK, JR.

*Attesting Officer*    *Commissioner of Patents and Trademarks*